United States Patent [19]

Mizobuchi et al.

[11] Patent Number: 4,774,463
[45] Date of Patent: Sep. 27, 1988

[54] BEARING ASSOCIATED WITH MEANS FOR DETERMINING ROTATIONAL SPEED

[75] Inventors: Shotaro Mizobuchi, Ebina; Yoshikazu Kimura, Yokohama; Katsumi Sasaki, Oismachi, all of Japan

[73] Assignee: Ebara Corporation, Tokyo, Japan

[21] Appl. No.: 925,263

[22] Filed: Oct. 31, 1986

[30] Foreign Application Priority Data

Oct. 31, 1985 [JP] Japan .................. 60-244920

[51] Int. Cl.⁴ .............................. G01D 5/34
[52] U.S. Cl. .................... 324/175; 384/448; 250/231 SE; 340/870.02
[58] Field of Search ............... 324/175; 384/448, 369, 384/123; 250/231 SE; 340/870.02

[56] References Cited

U.S. PATENT DOCUMENTS

| 3,693,024 | 8/1972 | Hulle | 250/231 SE |
|---|---|---|---|
| 3,757,128 | 9/1973 | Vermeulen | 250/231 SE |
| 3,935,447 | 1/1976 | Black | 250/231 SE |
| 4,093,853 | 6/1978 | Hunt | 250/231 SE |
| 4,132,890 | 1/1979 | Garcia et al. | |
| 4,253,021 | 2/1981 | Ernst | 250/231 SE |
| 4,327,362 | 4/1982 | Hoss | 250/231 SE |
| 4,652,746 | 3/1987 | Fenske | 250/231 SE |

FOREIGN PATENT DOCUMENTS

| 0178694 | 4/1986 | European Pat. Off. | 250/231 SE |
|---|---|---|---|
| 2245950 | 9/1973 | France | |
| 580812 | 10/1976 | Switzerland | |

Primary Examiner—Reinhard J. Eisenzopf
Assistant Examiner—Jose M. Solis
Attorney, Agent, or Firm—Wenderoth, Lind & Ponack

[57] ABSTRACT

A thrust bearing contructed to comprise a pair of disc elements one of which is arranged to rotate and the other of which is kept stationary, the surface of the rotating side opposing the stationary element being provided with a pattern of spiral grooves which are non-reflective while the remaining lands of the pattern are reflective so that a pulsed light beam is reflected from the pattern when a light beam is directed onto the rotating pattern through a hole provided in the stationary element, the reflected light pulses being utilized for determining the rotational speed of the element under rotation.

2 Claims, 3 Drawing Sheets

BEARING ASSOCIATED WITH MEANS FOR DETERMINING ROTATIONAL SPEED

FIELD OF THE INVENTION

The present invention relates to a bearing for supporting a rotary body and more particularly to a bearing associated with a means for measuring the rotational speed or the number of revolutions of the rotary body.

BACKGROUND OF INVENTION

There have been several devices or instruments available for measuring rotational speeds, for example, a mechanical tachometer, or an electric encoder, etc. Also, as a means contained within an apparatus, a combination of a magnet piece secured to a rotary member and a hall element for detecting the rotation of the magnet piece has been available. Further, as an instrument for measuring the number of revolutions, water meters or distance meters for automobiles, etc. have been available.

However, the above reference means or instruments require a certain space for installation or a complex transmitting means. For example, where a tachometer or encoder is employed, such device has to be coupled to a rotating shaft and a part of such means is required to be secured to an end of the shaft. When a hall element is used to detect the rotation of the magnet piece, it is necessary to secure the magnet piece to the rotary member and, sometimes, such as when the rotation speed is quite high, it is necessary to embed the magnet piece in the rotating member. If a water meter is employed, a gear train involving plural gears would be needed to transmit the rotation of an impeller to a counter which indicates the total sum of the number of revolutions by using each of the figures and this necessitates an expensive and complex one. Also with a distance meter for an automobile, the construction thereof is complex since it employs means for taking up figures.

There has also been available an optical means for detecting an intermittently reflected light from a rotating object. In this case, a rotating object is specifically made transparent or a reflective portion is provided in the rotating object for generating intermittent light pulses.

Thus, the particular arrangements heretofore available for utilizing an optical measuring means have required additional elements and expense.

SUMMARY OF THE INVENTION

Accordingly, it has been desired to have a means for measuring a rotational speed or number of revolutions which is simple in construction and easily installed without requiring a large space or complex coupling arrangement, etc.

It is an object of the present invention to provide a means for measuring a rotational speed or number of revolutions which is both simple in construction and easily installed.

According to the present invention, an apparatus associated with a bearing is provided, the bearing being a thrust bearing of the type comprising a pair of opposing flat elements, one of the opposing surfaces being provided with a pattern of spiral grooves for generating a fluid dynamic pressure which acts to suspend a thrust imposed on the bearing when the two elements make relative rotation with respect to each other. More specifically, the surface on which the pattern is formed is normally finished quite smooth at first so that it becomes substantially a mirror surface and, thereafter, a shot blasting process is applied through a mask to form the spiral grooves which are dull and not mirrored in contrast to the portions without grooves or lands which remain as mirrored or reflective surfaces after the shot blasting. Accordingly, a series of alternately appearing mirrored and dull surfaces are to be seen when the element having the pattern of spiral grooves rotates. The present invention is devised to utilize such alternately appearing mirrored and dull surfaces, which form a part of the thrust bearing, by directing light onto the series of such surfaces and detecting reflected light as pulses. Usually the element having the pattern of spiral grooves is secured to an end of a rotatable shaft and the other element is disposed stationarily. In the stationary element, a through hole is provided so that light is transmitted to the surface having the pattern of grooves and light reflected from that surface is directed through the hole to a photosensor or the like for determination of the rotational speed.

The thrust bearing explained above substantially comprises the two elements just referred to. However, there is another type of thrust bearing also utilizing spiral grooves such as that disclosed in U.S. Pat. No. 4,575,264, wherein a disc member having a pattern of spiral grooves on each of respective oppositely disposed flat surfaces is disposed between a pair of opposing flat surface members one of which is unitarily coupled with the rotary shaft so that the shaft may rotate in either the normal or the reverse direction. Usually, in the normal direction, the disc member rotates together with the shaft and, in the reverse direction, the disc member is kept stationary relative to the shaft by arranging the spiral directions on opposite sides to be reverse to each other. In this case, if a through hole is provided in one of the flat surface members which is arranged to be stationary and opposite to that coupled to the shaft, the rotational speed may be determined by directing light therethrough onto the disc member having the pattern of spiral grooves and redirecting the reflected light from the disc member to a photosensor when the shaft rotates in the normal direction. Further, if the shaft rotates in the reverse direction, there would be no signal from the photosensor but a current meter would show the consumption of power. Thus the apparatus according to the present invention is able to indicate that the shaft is rotating in the reverse direction, though the rotational speed can not be detected.

According to an embodiment of the present invention, a spiral element having the form of a disc and having a pattern of spiral grooves on one surface is secured to an end of a rotatable shaft, or a disc having a pattern of spiral grooves on opposite surfaces is rotated with the shaft and a sliding surface element having the form of a disc is stationarily disposed so that the surface having the spiral pattern opposes the mirror finished surface of the sliding surface element. A through hole is formed in the stationary sliding surface element to allow light to be transmitted from a light source toward the surface having the spiral pattern and reflected light to be directed from the spiral surface to a light detecting means for determining the rotational speed of the shaft.

The present invention will become more clear when the ensuing description is read referring to the accompanying drawings, a summary of which is given hereunder.

DETAILED DESCRIPTION OF PREFERRED EMBODIMENTS

Figure 1:
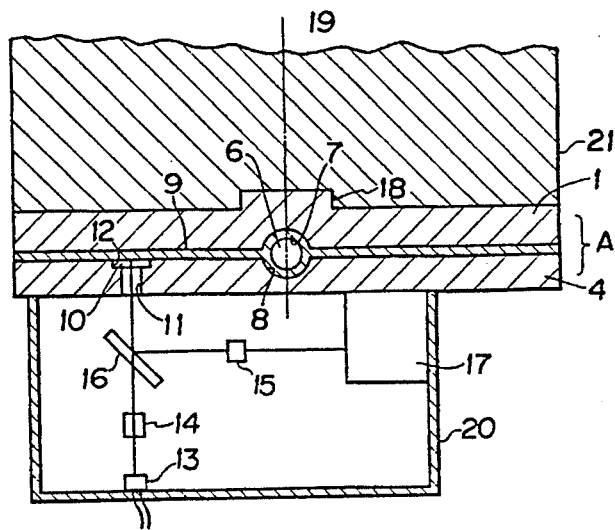
FIG. 1 is a schematic illustration partially in cross section showing an embodiment according to the present invention.
Figure 2:
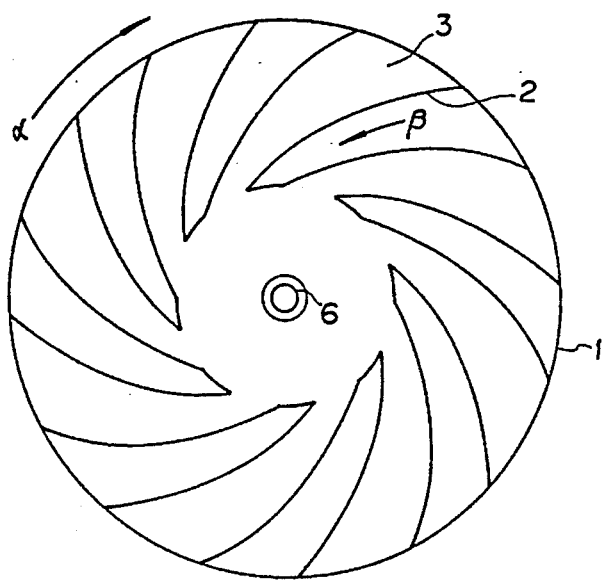
FIG. 2 shows a pattern of spiral grooves on the surface of a spiral element.

Referring now to FIGS. 1 and 2, there is shown a preferred embodiment according to the present invention. A thrust bearing "A" is formed which comprises a spiral element 1, a sliding surface element 4 and a small sphere 6. The elements 1 and 4 are substantially in the form of discs and are provided with opposing flat surfaces. On the flat surface of the spiral element, a pattern of spiral grooves 2 is formed as illustrated in FIG. 2. The spiral element 1 is secured to a rotary shaft 21 by means of a projection 18 so that it rotates with the shaft. As stated earlier, the flat surface of the element 1 is finished such as to form a mirrored surface on which the grooves 2 are formed, lands 3 remaining, the surfaces of which are mirrored surfaces for reflecting light, while the grooves 2 are non-reflective. The flat surface of the sliding surface element 4 is also super-finished so as to form a mirrored surface. On each of th flat surfaces of the elements 1 and 4, spherical dents 7 and 8 are respectively provided to form a space aligned with the axis 19 of the shaft 21 for receiving the sphere 6 therein. The axial length of the space is made slightly longer than the diameter of the sphere 6 so that the two flat surfaces may contact each other while radial displacement of one element relative to the other is prevented, whereby the bearing "A" may withstand not only the thrust load but also a radial load within a certain range. Between the opposing flat surfaces is disposed lubricant or grease 9 having high viscosity which is transparent to light.

The spiral element 1 is preferably made of a material having good thermal conductivity, and highly resistant to compression while at the same time allowing working on the surface thereto to be carried out. In practice, ceramics such as silicon carbide (SiC), silicon nitride ($Si_3N_4$) etc. are selected. A porous SiC is preferred; however a dense one may also be employed. Spiral grooves 2 are formed by a shot blasting process to a depth of approximately 3–50 $\mu$m leaving lands 3 each retaining its original mirror finished surface. As for the material for the sliding surface element 4, this is selected from such materials as silicon carbide (SiC), alumina ceramics ($Al_2O_3$), super hard alloy, bronze containing lead (Pb), cast iron and 13% Cu Stainless Steel, etc., which may be dense or porous. The small sphere 6 is made of porous silicon carbide (SiC) impregnated with a lubricant having high viscosity or may be made of bearing steel. It is to be noted that the porous material is employed only for the spiral element 1 and the small sphere 6 and the combination of these materials is arranged to be as shown in the following table.

|  | Combination | | |
| --- | --- | --- | --- |
|  | I | II | III |
| Spiral element 1 | porous | dense | dense |
| sliding surface element 4 | dense | dense | dense |
| small sphere 6 | dense | porous | dense |

The thickness of a film of lubricant 9 is as thin as about 1.5 $\mu$m assuming the pressure on the opposing surfaces of the elements 1 and 4 to be about 200 kg/cm$^2$. Therefore, the total amount of lubricant is quite small. For example, when the outer diameter of the element 1 is 50 mm, the total amount of lubricant would be 0.003 cc.

In the combination II above with the element 1 having an outer diameter of 50 mm, the diameter of the sphere 6 would be 2 mm and the porous ratio thereof would be 60% assuming the material to be SiC.

In the sliding surface element 4, a through hole 11 is provided in a region corresponding to an annular region where the pattern of spiral grooves 2 is present on the spiral element 1. At the side of the element 4 and facing the same is formed a counter-bored hole 12 which is bored to a certain depth such as 30 $\mu$m where a transparent glass plate 10 is disposed.

A light source such as a laser semiconductor 13 is positioned below the element 4 so as to allow a laser beam to be directed through the hole 11 on the surface of the element provided with the spiral grooves 2. The laser beam is reflected from the surface having the series of lands 3 and grooves 2 provided alternately in the rotating direction and the reflected light is directed onto a half mirror 16 and transmitted to a photosensor 15 which sends signals to a signal processor 17. Since the laser beam or light beam is reflected from the alternate series of lands 3 and groves 2, the lands 3 being reflective and the grooves being nonreflective, the signal derived from the reflected light is a pulse signal. The pulses of the signal may either be counted in number or converted to determine the revolutional speed by the processor 17. As illustrated in FIG. 1, the laser beam from the semiconductor 13 is passed through an optical lens 14 and the half-mirror 16 before reaching the surface having the spiral grooves 2, the lens 14 being a collimating means such as a cylindrical lens. The optical elements 13, 14, 15, 16 and 17 referred to above are conveniently housed within a casing 20.

At the time of rotation of the shaft 21, the spiral element 1 is unitarily rotated with the shaft and the bearing A bears the thrust load of the shaft 21 assuming that the spiral element 1 is rotated in the direction indicated by an arrow $\alpha$. If rotation is in the direction $\alpha$, the lubricant 9 is urged in the direction indicated by the arrow $\beta$ whereby fluid dynamic pressure is induced between the elements 1 and 4 such as to suspend the thrust. The embodiment shown in FIGS. 1 and 2 may withstand thrusts of approximately 200 kg/cm$^2$.

Figure 3:
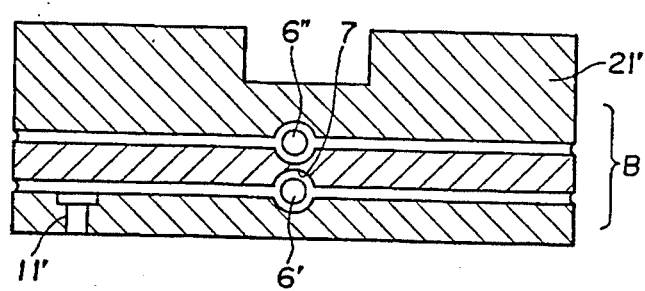
FIG. 3 shows a modified embodiment which permits a shaft to rotate in both of the two directions.

As briefly discussed in the foregoing, if a thrust bearing B shown in FIG. 3 is employed wherein a thrust element 1' is provided with a pattern of spiral grooves on each of the respective oppositely disposed surfaces with the direction of the spirals being reverse to each other, a shaft 21' may rotate in either of the directions and the revolutional speed may be sensed through a hole 11' by employing an optical system similar to that shown in FIG. 1 only where the shaft 21' rotates in the normal direction. When the shaft 21' rotates in the reverse direction, the reverse rotation may be sensed by, for example, detecting the fact that there is consumption of power by noticing a current meter but no pulses generated from the surface of the spiral element 1 which is kept stationary.

Spheres 6' and 6" are employed in a manner similar to the sphere 6 in FIG. 1.

Figure 4:
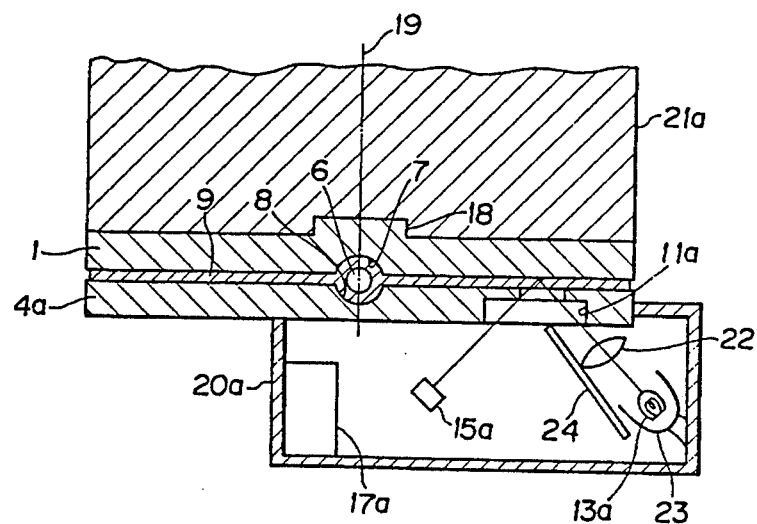
FIG. 4 is another embodiment in which an optical system different from that of FIG. 1 is employed.

In FIG. 4, a modified embodiment according to the present invention is shown.

The same reference numerals as those used in FIG. 1 are employed except for elements which are different from those in FIG. 1; however, elements which are similar to those in FIG. 1 are each given the suffix "a". In this embodiment, a through hole 11' provided in a sliding surface element 4' is enlarged at the side opposite that which directly faces the spiral element 1.

A light source 13a is arranged to direct a light beam through a lens 22 onto the surface of the element 1 having the pattern of spiral grooves 3 and the light beam is reflected towards a photosensor 15a which transmits the signal derived from a pulsed reflected beam to a signal processor 17a. Around the light source 13a is provided a reflector 23 and a blocking plate 24 which ensure that light is not directly directed to a photosensor 15a from the light source 13a. As in the case of the first embodiment, a casing 20a is provided to encase the optical elements.

With the arrangement provided according to the present invention, it becomes possible to dispense with the need to specifically attach additional elements to rotating elements while determining the rotational speed of a rotating member with a simple optical system. The thrust bearing of the type employed is simple in construction but withstands a high thrust load such as approximately 200 kg/cm$^2$. In tests conducted with respect to the arrangement shown in FIG. 1, the bearing was found to be undamaged and to have suffered no wear after repeating stop and rotation 100,000 times with a thrust of 200 kg/cm$^2$ and using grease. In the case of rotating the bearing within water, grease was found to have been substantially maintained within the bearing and no contamination of the grease with water was found.

Figure 5:
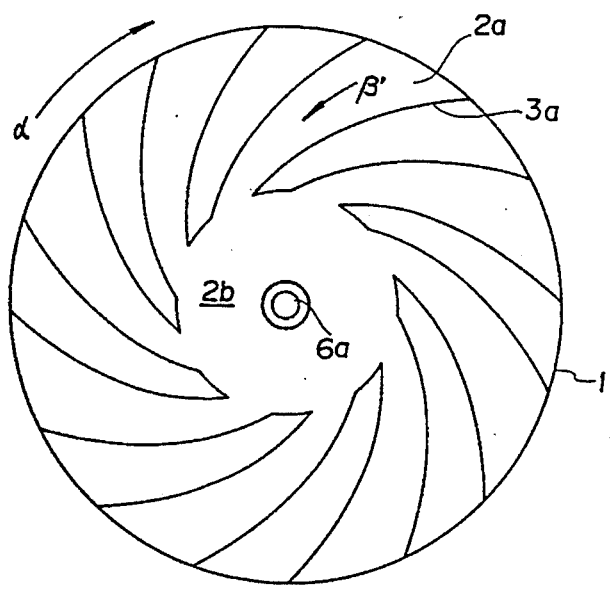
FIG. 5 shows a pattern different from that shown in FIG. 2.
Figure 6:
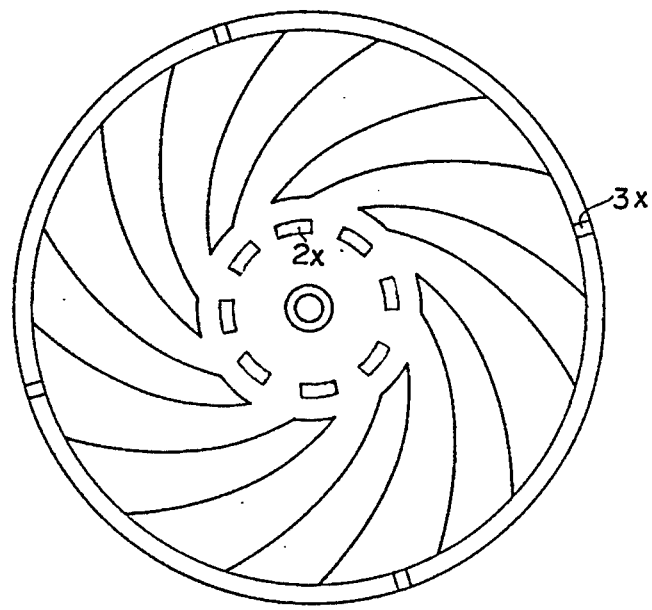
FIG. 6 shows a modified surface of the spiral element having different reflecting portions.

As to the pattern of spiral grooves, it has been explained that the pattern is formed by shot blasting on the mirror finished surface through a mask so that the lands remain reflective and the grooves become non-reflective. Also, as shown in FIG. 5, grooves 2a may be formed with a central area 2a recessed to the same depth as that of the grooves 2a. In this case, lubricant is urged in the direction $\beta'$ with the rotational direction $\alpha$. However, if the alternate arrangement of the reflective and non-reflective surfaces is provided on the rotating element, the present invention may also be applicable to such arrangement. For example, a modification is shown in FIG. 6, in which mirror finished portions 3× are provided outwardly of the spiral grooves with the appropriate numbers or a series of circularly arranged non-reflective portions 2× provided so that, upon rotation of the spiral element, a series of reflected light pulses is generated. Such an arrangement may sometimes be feasible when it is desired to make the arrangement compatible with an already available optical counter system. Note that the number of grooves is not limited to those illustrated. The spatial distance between the spiral element and the sliding surface in the present invention is quite short, such as 5 to 60 $\mu$m and, therefore, there is no substantial attenuation of the light due to the presence of lubricant therebetween even if the lubricant is colored.

As for the optical system, an optical fiber system may also be employed wherein a light source, such as LED (light emitting diode) or semiconductor laser and other elements may be located at any convenient position remote from the bearing.

The present invention has been explained in detail by referring to specific embodiments; however, it is to be noted that the present invention is not limited to those explained and may be modified or changed by those skilled in the art within the scope of the present invention as defined in the claims appended hereto.

What is claimed is:

1. A bearing device associated with a means for determining the rotational speed of a rotating body, said bearing being of the thrust bearing type including:
   a spiral element formed in a disc shape and having a flat mirror finished surface on which a pattern of spiral grooves is formed, the pattern including alternate lands having reflective surfaces and grooves having non-reflective surfaces; and
   a sliding surface element in the form of a disc having a flat mirror finished surface on one side thereof, the flat mirror finished surface being arranged to oppose the mirror finished surface of said spiral element, said spiral element being secured to said rotating body and said sliding surface element being held stationarily, said means for determining the rotational speed comprising:
   a through hole provided in said sliding surface element in a region corresponding to the location of said pattern of spiral grooves; and
   an optical system for directing a light beam to the surface having the spiral grooves through said through hole and redirecting the light beam reflected through said through hole as light pulses to an optical sensor for producing pulsed signals, the signals being transmitted to a processor for conversion to a value representing a speed of number of revolutions.

2. A bearing as claimed in claim 1 wherein said optical means includes an optical fiber means for transmitting light beams to and from said mirror finished surface having the spiral grooves.

* * * * *